United States Patent [19]
Brent, Jr. et al.

[15] 3,642,456
[45] Feb. 15, 1972

[54] PROCESS FOR PURIFYING GYPSUM USING FLUOSILICIC ACID

[72] Inventors: John T. Brent, Jr., Glen Burnie, Md.; Jack S. Page, Tampa, Fla.

[73] Assignee: W. R. Grace & Co., New York, N.Y.

[22] Filed: July 29, 1969

[21] Appl. No.: 845,871

[52] U.S. Cl. ................................. 23/304, 23/122, 23/153
[51] Int. Cl. ......................................... B01d 9/02, C01f 11/46
[58] Field of Search .................... 23/304, 153, 312 F, 122

[56] References Cited

UNITED STATES PATENTS

| | | | |
|---|---|---|---|
| 782,321 | 2/1905 | Brothers | 23/304 |
| 1,969,449 | 8/1934 | Bryan | 23/122 |
| 2,636,806 | 4/1953 | Winter | 23/153 |
| 2,699,985 | 1/1955 | Delruelle | 23/304 |
| 3,273,713 | 9/1966 | Parish | 23/153 |
| 3,326,633 | 6/1967 | Carothers et al. | 23/122 |
| 3,505,013 | 4/1970 | Araki et al. | 23/122 |

*Primary Examiner*—Norman Yudkoff
*Assistant Examiner*—R. T. Foster
*Attorney*—Charles L. Harness and Kenneth E. Prince

[57] ABSTRACT

In abstract, this invention is directed to a process for purifying crude gypsum, comprising dissolving the gypsum in a hot aqueous fluosilicic acid solution, separating the resulting gypsum containing solution from insoluble impurities, cooling the separated gypsum solution to precipitate purified gypsum therefrom, separating the purified gypsum from the mother liquor from which it (the purified gypsum) was precipitated, washing the separated gypsum, and recovering the washed gypsum, all as recited hereinafter.

6 Claims, No Drawings

PROCESS FOR PURIFYING GYPSUM USING FLUOSILICIC ACID

BACKGROUND OF THE INVENTION

This invention is in the field of gypsum purification.

U.S. Pat. Nos. 3,159,497 (Yamaguchi, 106/89) and 1,822,815 (Lichtenberger et al.) describe prior art processes for purifying crude gypsum.

SUMMARY OF THE INVENTION

In summary, this invention is directed to a process for purifying crude gypsum, comprising: (a) dissolving at least a portion of the gypsum component of the crude gypsum in a hot aqueous fluosilicic acid solution; (b) separating the resulting gypsum containing solution from insoluble impurities and undissolved material; (c) cooling the separated gypsum-containing solution to precipitate purified gypsum therefrom and to form a liquid mother liquor; (d) separating the purified gypsum from the mother liquor; (e) washing the separated gypsum; and (f) recovering the washed gypsum.

DESCRIPTION OF PREFERRED EMBODIMENTS

In preferred embodiments of the invention set forth in the above summary:

1. The aqueous fluosilicic acid solution analyzes about 15–26 percent (preferably about 23–25 percent) $H_2SiF_6$;
2. Each part by weight of crude gypsum is extracted with about 1–7 (preferably about 1.1–1.5) parts by weight of the aqueous fluosilicic acid solution;
3. The separated gypsum-containing solution is cooled to about 75°–100° F. (preferably to about 80°–90° F.) to precipitate gypsum therefrom;
4. The separated gypsum is washed with about 1,000–2,000 (preferably about 1,500–1,800) parts of water per 2,000 parts of separated gypsum, the temperature of the wash water being about 70°–85° F. (preferably about 75°–80° F.); and
5. The washed gypsum is dried at about 200°–250° F. (preferably about 210°–225° F.), thereby to free it (the washed gypsum) of free water (i.e., occluded water—not water of crystallization), before being recovered. If desired, the washed gypsum can be "dried" at a somewhat higher temperature (e.g., ca. 127°–160° C. (ca. 260°–320° F.)) to partially dehydrate it, the washed gypsum, to plaster of Paris ($CaSO_4 \cdot \frac{1}{2}H_2O$) which is then recovered or at a considerably higher temperature (e.g., ca. 200°–300° C. (ca. 390°–570° F.) or higher) to substantially completely dehydrate it, the washed gypsum, and convert it to anhydrate (anhydrous $CaSO_4$) which is then recovered.

In another preferred embodiment (Embodiment A) this invention is directed to:

A process for purifying crude gypsum (including naturally occurring crude gypsum and crude gypsum obtained as a byproduct in the manufacture of wet process phosphoric acid), comprising:

a. mixing the crude gypsum with an aqueous fluosilicic acid (hydrofluoric acid, silicofluoric acid ($H_2SiF_6$)) solution at about 160°–195° F. to obtain a liquid phase and a solid phase;

b. separating the liquid phase from the solid phase (e.g., by filtration, centrifugation, or decantation) while maintaining the temperature of the liquid phase within a range of about 160°–195° F.;

c. cooling the separated liquid phase to about 75°–100° F. (preferably to about 80°–90° F.) to precipitate gypsum therefrom;

d. separating the precipitated gypsum from the liquid phase (e.g., by filtration, centrifugation, or decantation);

e. washing the separated gypsum with water to remove fluosilicic acid therefrom;

f. recovering the washed separated gypsum.

DETAILED DESCRIPTION OF THE INVENTION

Gypsum ($CaSO_4 \cdot 2H_2O$) is a well-known article of commerce. It is used to make plaster of Paris wallboard, and stucco. Gypsum is also used as an additive to lengthen the setting time of cement and mortar and in the "sulfide smelting" of low-grade nickel ore. Gypsum which has been purified by the process of this invention has been found to be excellently adapted for such uses. There are two principle sources of gypsum. These are: (a) naturally occurring gypsum; and (b) byproduct gypsum which results from the production of wet process phosphoric acid.

Naturally occurring gypsum varies in grade from substantially pure gypsum to gypsum which is highly contaminated with water-soluble materials such as sodium sulfate and the like and/or with substantially water-insoluble materials including iron compounds, aluminum compounds, and substantially water-insoluble phosphates and/or fluorides.

Gypsum obtained as a byproduct from the manufacture of wet process phosphoric acid (hereinafter called "byproduct gypsum") is generally contaminated with water-soluble phosphates (including $H_3PO_4$) and with substantially water-insoluble components, especially water-insoluble components selected from the group consisting of water-insoluble fluorides, phosphates, iron compounds, aluminum compound, and mixtures thereof.

The process of this invention has been used with excellent results to purify: (a) crude (low-grade) naturally occurring gypsum—including such gypsum where contaminated with substantially water-insoluble components; and (b) crude byproduct gypsum.

In the process of this invention a hot aqueous fluosilicic acid solution is used to dissolve the gypsum component of crude gypsum. Impurities in the crude gypsum which are not soluble in the hot aqueous fluosilicic acid solution are separated from the resulting hot aqueous phase (a hot solution of fluosilicic acid, water, and dissolved gypsum plus those impurities such as calcium phosphate, $H_3PO_4$, and various iron compounds, aluminum compounds and fluorine compounds which are soluble in the hot aqueous solution). The hot aqueous phase is cooled (for example, indirectly with cold water, with refrigeration coils, with blasts of cold air directed against the container in which the hot aqueous phase is contained, or the like), thereby precipitating purified gypsum. Except for very small amounts (i.e., "trace quantities" generally under 1 percent by weight based on the weight of the recovered gypsum), the impurities which dissolved along with the gypsum in the hot fluosilicic acid are not precipitated with the purified gypsum when such gypsum is precipitated upon cooling the hot aqueous phase. Thus, the precipitated gypsum is substantially pure gypsum except that it is contaminated with the mother liquor (principally aqueous fluosilicic acid solution) from which it (the precipitated gypsum) was precipitated. The precipitated gypsum is then purified by washing with water to free it (the precipitated gypsum) of said mother liquor. If desired, the washed purified gypsum can be dried, for example, in a rotary drum dryer in a stream of hot air having an inlet temperature of about 200°–250° F.; alternatively, the washed gypsum can be air dried (e.g., using air at about room temperature), or it can be dried under vacuum. Still other methods for drying the washed gypsum will be readily apparent to those skilled in the art. The dried gypsum is then recovered.

In a fully equivalent procedure the gypsum can be partially dehydrated to yield plaster of Paris ($CaSO_4 \cdot \frac{1}{2}H_2O$) or it (the gypsum) can be dehydrated further to yield soluble anhydrite, or stucco, or anhydrite (which are well-known articles of commerce) by adjusting the temperature at which the gypsum is dried and dehydrated. As a consequence of the instant disclosure and the well-known literature dealing with calcium sulfate, when said literature is read in the light of the instant disclosure, such temperature adjustment is well within the ability of one of ordinary skill in the art.

The following nonlimiting specific examples further illustrate the instant invention.

EXAMPLE I

A series of runs was made to determine the solubility of gypsum in aqueous fluosilicic acid solutions of various concentrations at several temperatures. The following procedure was used:

A 400-gram portion of gypsum was agitated (extracted) with an accurately measured volume (ca. 450 ml. of hot (160° F.) aqueous fluosilicic acid solution (15 percent $H_2SiF_6$). The undissolved gypsum was separated from the hot aqueous phase by filtration. The hot filtrate was cooled to room temperature (ca. 75° F.), thereby to precipitate gypsum which was recovered by filtration, washed, dried, and weighed. The mother liquor from which the gypsum had been precipitated was analyzed for sulfate and calcium ions by conventional procedures (sulfate was determined gravimetrically and calcium was determined by an instrumental procedure—atomic absorption analysis.). The amount of gypsum remaining dissolved in said mother liquor was calculated from such analyses. The combined weights of the precipitated gypsum and the gypsum remaining in the mother liquor were used to calculate the solubility of gypsum in 15 percent $H_2SiF_6$ at 160° F. Similar runs were made with 15 percent $H_2SiF_6$ at extraction temperatures of 175° F. and 195° F. Additional runs were made with 20 percent and 25 percent $H_2SiF_6$ solutions with extraction temperatures of 160° F., 175° F., and 195° F. The results of these runs are presented in the following table:

Solubility of Calcium Sulfate in Aqueous $H_2SiF_6$ Solutions

Gram of $CaSO_4$ per Gram of Aqueous $H_2SiF_6$ Solution

| Concentration of Aqueous $H_2SiF_6$ Solution | Extraction temperature, °F. | | |
| --- | --- | --- | --- |
| | 160 | 175 | 195 |
| 15% | 0.027 | 0.029 | 0.046 |
| 20% | 0.039 | 0.044 | 0.054 |
| 25% | 0.044 | 0.050 | 0.059 |

EXAMPLE II

Crude byproduct gypsum analyzing 90 percent gypsum, 0.85 percent fluoride, 0.17 percent $Fe_2O_3$, 0.22 percent $Al_2O_3$, and 0.60 percent $P_2O_5$ was used in the runs reported in this example.

A 400-gram portion of the aforesaid crude gypsum was agitated (extracted) with a 450-ml. portion of a hot (160° F.) aqueous solution of $H_2SiF_6$ analyzing 15 percent $H_2SiF_6$. The undissolved solid (gypsum and impurities) was separated from the hot aqueous phase which was then cooled to about 75° F., thereby to precipitate dissolved gypsum. The precipitated gypsum was separated from the mother liquor, washed with water until substantially free of mother liquor, dried at about 75°–85° F., recovered, and analyzed for calcium and sulfate. The purity of the recovered gypsum was calculated from these analyses. An additional run was made with 15 percent $H_2SiF_6$ solution at 175° F. (i.e., the extraction temperature was 175° F.). Similar runs were made with 20 percent and 25 percent $H_2SiF_6$ solutions at extraction temperatures of 160° F., 175° F., and 195° F. Results of these runs are presented in the following table:

| | Purity of Recovered | Gypsum % | |
| --- | --- | --- | --- |
| Concentration of $H_2SiF_6$, % | Extraction temperature, °F. | | |
| | 160 | 175 | 195 |
| 15 | 99.8 | 99.7 | — |
| 20 | 99.2 | 99.0 | 99.1 |
| 25 | 99.6 | 99.6 | 99.6 |

Substantially identical results have been obtained with samples of crude naturally occurring gypsum analyzing (before purification) from about 80–95 percent gypsum. Where using crude naturally occurring gypsum which contains appreciable quantities (e.g., more than about 2 percent) of water-soluble impurities, we generally prefer to extract such impurities by washing the crude gypsum with water before extracting with $H_2SiF_6$ solution.

EXAMPLE III

A sample of crude byproduct gypsum (Lot No. 3) having the following analysis was used in this example.

| Component | % |
| --- | --- |
| $P_2O_5$ | 0.60 |
| CaO | 25.03 |
| $SO_4$ | 41.92 |
| F | 0.85 |
| $Fe_2O_3$ | 0.17 |
| $Al_2O_3$ | 0.22 |
| Free Water | 9.38 |
| Combined Water | 15.67 |

A 300-gram portion of said crude gypsum was extracted with a 1,500-ml. portion of 16.05 percent $H_2SiF_6$ at 158° F. (70° C.), the resulting solution was separated from the undissolved solid phase, and said solution was cooled to room temperature (ca. 70° F.) to precipitate the dissolved gypsum which was separated from the mother liquor, washed with about 1,375–1,400 ml. of water, at about 75° F., air dried at room temperature, and analyzed.

Similar runs were made using extraction temperatures of 176° F. (80° C.) and 194° F. (90° C.). The results of these runs are presented in the following table:

Analyses of Purified Gypsum Samples, % By Weight

| Component | Extraction temperature, °F. | | |
| --- | --- | --- | --- |
| | 158 | 176 | 194 |
| $P_2O_5$ | 0.05 | 0.05 | 0.03 |
| CaO | 28.35 | 25.38 | 23.85 |
| $SO_4$ | 49.37 | 43.76 | 40.97 |
| F | 0.07 | 0.08 | 0.08 |
| $Fe_2O_3$ | 0.02 | <0.01 | <0.01 |
| $Al_2O_3$ | <0.01 | <0.01 | <0.01 |
| Free $H_2O$ | 11.94 | 21.50 | 25.56 |
| Combined $H_2O$ | 18.43 | 16.19 | 15.38 |

EXAMPLE IV

The general procedure of Example III was repeated using crude gypsum from Lot. No. 3 (described supra); however, in this instance fluosilicic acid solution analyzing 20.66 percent $H_2SiF_6$ was used to extract gypsum from the crude byproduct gypsum.

The results obtained are presented in the following table:

Analyses of Purified Gypsum Samples, % By Weight

| Component | Extraction temperature, °F. | | |
| --- | --- | --- | --- |
| | 158 | 176 | 194 |
| $P_2O_5$ | 0.05 | 0.08 | 0.05 |
| CaO | 24.68 | 28.70 | 28.88 |
| $SO_4$ | 42.87 | 48.02 | 50.29 |
| F | 0.12 | 0.19 | 0.08 |
| $Fe_2O_3$ | <0.01 | <0.01 | <0.01 |
| $Al_2O_3$ | <0.01 | <0.01 | <0.01 |
| Free $H_2O$ | 22.97 | 9.67 | 10.48 |
| Combined $H_2O$ | 16.03 | 18.16 | 18.79 |

EXAMPLE V

The general procedure of Example III was repeated using crude byproduct gypsum from Lot No. 3 (described supra);

however, in this instance fluosilic acid solution analyzing 25.16 percent $H_2SiF_6$ was used.

The results obtained are presented in the following table:

Analyses of Purified Gypsum Samples, % By Weight

| Component | Extraction temperature, °F. | | |
|---|---|---|---|
| | 158 | 176 | 194 |
| $P_2O_5$ | 0.05 | 0.03 | 0.05 |
| CaO | 26.08 | 25.46 | 28.18 |
| $SO_4$ | 43.62 | 43.92 | 48.71 |
| F | 0.14 | 0.12 | 0.11 |
| $Fe_2O_3$ | 0.02 | <0.01 | <0.01 |
| $Al_2O_3$ | <0.01 | <0.01 | <0.01 |
| Free $H_2O$ | 20.84 | 22.69 | 12.68 |
| Combined $H_2O$ | 16.49 | 16.45 | 18.23 |

In other runs the washed purified gypsum was dried at about 260°–320° F. to convert it to plaster of Paris ($CaSO_4 \cdot \frac{1}{2}H_2O$) and in still other runs the washed purified gypsum was dried at about 390°–570° F. to convert it to anhydrite ($CaSO_4$).

As used herein the term "percent (%)" means parts per hundred, and the term "parts" means parts by weight unless otherwise defined where used.

We claim:
1. A process for purifying crude gypsum in solid form comprising:
   a. dissolving at least a portion of the said gypsum component of the crude gypsum in a hot aqueous fluosilicic acid solution which analyzes at about 15–26 percent $H_2SiF_6$ such that each part by weight of crude gypsum is extracted with about 1–7 parts by weight of said hot aqueous fluosilicic acid solution;
   b. separating the resulting gypsum-containing solution from undissolved material;
   c. cooling the separated gypsum-containing solution to about 75°–100° F. to precipitate gypsum therefrom and to form a liquid mother liquor;
   d. separating the purified gypsum from the mother liquor;
   e. washing the separated gypsum; and
   f. recovering the washed gypsum, said washed gypsum having less than about 1 percent by weight impurities.

2. The process according to claim 1 wherein the separated gypsum is washed with about 1,000–2,000 parts of water per 2,000 parts of separated gypsum, the temperature of the wash water being about 70°–85° F.

3. The process according to claim 1 wherein the washed gypsum is dried at about 200°–250° F., thereby to free it of free water, before being recovered.

4. A process for purifying crude gypsum, comprising:
   a. mixing crude gypsum with a hot aqueous fluosilicic acid solution at about 160°–195° F., said hot aqueous fluosilicic acid solution analyzing at about 15–26 percent $H_2SiF_6$ and such that each part by weight of said crude gypsum is extracted with about 1–7 parts by weight of said hot aqueous fluosilicic acid solution, to obtain a liquid phase and a solid phase;
   b. separating said liquid phase from said solid phase while maintaining the temperature of the liquid phase within a range of about 160°–195° F;
   c. cooling the separated liquid phase to about 75°–100° F. to precipitate gypsum therefrom;
   d. separating the precipitated gypsum from the liquid phase;
   e. washing the separated gypsum with water to removed fluosilicic acid therefrom; and
   f. recovering the washed separated gypsum, said washed separated gypsum having less than about 1 percent by weight impurities.

5. The process according to claim 4 wherein the separated gypsum is washed with about 1,000–2,000 parts of water per 2,000 parts of separated gypsum, the temperature of the wash water being about 70°–85° F.

6. The process according to claim 4 wherein the washed gypsum is dried at about 200°–250° F., thereby to free it of free water, before being recovered.

* * * * *